United States Patent [19]
Bohn

[11] Patent Number: 5,541,771
[45] Date of Patent: Jul. 30, 1996

[54] BEAM SPLITTER FOR USE IN A COLOR IMAGING ASSEMBLY

[75] Inventor: David D. Bohn, Fort Collins, Colo.

[73] Assignee: Hewlett-Packard Company, Palo Alto, Calif.

[21] Appl. No.: 294,158

[22] Filed: Aug. 22, 1994

[51] Int. Cl.⁶ ............................................. G02B 27/14
[52] U.S. Cl. ...................... 359/634; 359/629; 359/637; 359/638
[58] Field of Search ........................ 359/618, 629, 634, 637, 639, 640, 583, 638; 250/226

[56] References Cited

U.S. PATENT DOCUMENTS

| | | | |
|---|---|---|---|
| 2,815,695 | 12/1957 | Scharf | 359/583 |
| 4,659,185 | 4/1987 | Aughton | 359/629 |
| 4,709,144 | 11/1987 | Vincent | 250/226 |
| 4,797,696 | 1/1989 | Allen | 354/4 |
| 4,806,750 | 2/1989 | Vincent | 250/226 |
| 4,870,268 | 9/1989 | Vincent et al. | 250/226 |
| 4,926,041 | 5/1990 | Boyd | 250/226 |
| 4,997,261 | 3/1991 | Taniura | 359/618 |
| 5,032,004 | 7/1991 | Steinle | 350/171 |
| 5,040,872 | 8/1991 | Steinle | 359/638 |
| 5,044,727 | 9/1991 | Steinle | 359/637 |
| 5,044,736 | 9/1991 | Jaskie | 359/583 |
| 5,406,066 | 4/1995 | Steinle | 250/208.1 |

FOREIGN PATENT DOCUMENTS 325363  7/1989  European Pat. Off. ............... 359/629

*Primary Examiner*—Georgia Y. Epps
*Assistant Examiner*—Ricky Mack

[57] ABSTRACT

A beam splitter and method for separating a polychromatic light beam into a plurality of spatially and spectrally separated color component beams which are focused at a common image plane. The beam splitter includes a plurality of dichroic surfaces which each reflect light in a first spectral range, a second spectral range, or a third spectral range, and transmit light in spectral ranges other than the one it reflects. The beam splitter also includes a plurality of reflective surfaces which are each disposed parallel to one of the dichroic surfaces and which each reflect light in at least two of the first, second and third spectral ranges. The relative distances between the dichroic surfaces and corresponding reflective surfaces are such that the path lengths of the color component beams are approximately equal.

16 Claims, 5 Drawing Sheets

BEAM SPLITTER FOR USE IN A COLOR IMAGING ASSEMBLY

BACKGROUND OF THE INVENTION

The present invention relates generally to color imaging assemblies utilizing beam splitters to generate spatially separated, color component images of an object which are focused on a common image plane. The invention relates more particularly to beam splitters which employ dichroic surfaces for separating a polychromatic imaging light beam into a plurality of spatially separated color component beams.

The phrase "light beam" is sometimes narrowly defined as a bundle of parallel light rays such as those generated by a collimated light source. The phrase "light beam" may also be more broadly defined as any narrow shaft of light having light rays traveling in the same general direction. Used in this broader sense, the light which emanates from an object and passes through the aperture of an imaging lens as well as the converging cone of light which emerges from the lens and which is focused at an image plane may be collectively referred to as a "light beam." When the phrase "light beam" is used herein, it is to be understood that this broader meaning is intended.

Imaging devices such as color scanners, video cameras, camcorders, and the like produce data signals representative of color images of subject objects. Beam splitters are typically utilized within such imaging devices to separate a polychromatic imaging light beam from the object into three separate color component beams which are in turn used to generate data signals which are representative of color component images (typically, red, green and blue component images) of the object. Various color imaging devices and assemblies utilizing beam splitters are described in U.S. Pat. No. 4,709,144 for COLOR IMAGER UTILIZING NOVEL TRICHROMATIC BEAMSPLITTER AND PHOTOSENSOR of Vincent; U.S. Pat. No. 4,870,268 for COLOR COMBINER AND SEPARATOR AND IMPLEMENTATIONS of Vincent et al.; U.S. Pat. No. 4,926,041 for OPTICAL SCANNER of Boyd et al.; U.S. Pat. No. 5,032,004 for BEAM SPLITTER APPARATUS WITH ADJUSTABLE IMAGE FOCUS AND REGISTRATION of Steinle; and U.S. Pat. No. 5,040,872 for BEAM SPLITTER/COMBINER WITH PATH LENGTH COMPENSATOR of Steinle, which are each hereby specifically incorporated by reference for all that is disclosed therein. A conventional color imaging assembly such as that shown in U.S. Pat. No. 5,040,872 will now be described with reference to FIGS. 1–3.

As shown in FIG. 1, the color imaging assembly 10 may comprise an imaging lens 12 adapted for receiving a polychromatic imaging light beam 14 emanating from an object (not shown), which in most color scanners is a line object or "scan line". The color imaging assembly 10 may also comprise a multilayered dichroic beam splitter 20 disposed obliquely in the path of the imaging light beam 14 for separating the imaging light beam 14 into a plurality of parallel, spatially separated, color component beams 40, 42, 44 (e.g., green, red and blue). Each layer 41, 43, 45 of the beam splitter 20 is adapted to reflect light in one spectral range and transmit light in other spectral ranges.

The color component beams 40, 42, 44 may be received by a photosensor 46 which may be comprised of a plurality of coplanar linear photosensor arrays 50, 52, 54. The linear photosensor arrays 50, 52, 54 are aligned with the color component beams 40, 42, 44, respectively. The color component beams 40, 42, 44 are focused on the linear photosensor arrays 50, 52, 54, respectively, at a common image plane II. The linear photosensor arrays 50, 52, 54 are typically charge coupled device (CCD) arrays adapted to transmit data signals representative of the intensity of the color component beams 40, 42, 44 to a suitable data processing and data storage unit (not shown) such as a personal computer or work station.

In order for the color component beams 40, 42, 44 to be focused at the image plane II, the distance travelled by each of the color component beams 40, 42, 44 from the imaging lens 12 to the photosensor 46 (also referred to herein as the "optical path length" or "total optical path length" of a beam) must be equal. It is apparent in FIG. 1 that, with this beam splitter configuration, the optical path lengths of the beams 40, 42, 44 are not equal. Thus, the color imaging assembly 10 must include a separate path length compensator such as the step-type path length compensator 60 shown in FIG. 1 which refractively compensates for differences in the optical path lengths of the color component beams 40, 42, 44.

Other techniques for resolving optical path length problems are disclosed in U.S. Pat. Nos. 4,709,144; 4,870,268; and 5,032,004 incorporated by reference above. For example, U.S. Pat. No. 5,032,004 discloses a beam splitter with three surface pairs, each pair comprising a surface which reflects light in two spectral ranges and a surface which reflects light in three spectral ranges. Color component beams created by the beam splitter are focused on an image plane which lies parallel to an associated photosensor array. The focus of the image provided by each color component beam on each photosensor array may be adjusted by varying the distance between the surfaces in each pair. Registration of each color component beam with an associated photosensor array may be controlled by varying the angular relationship between the surfaces in each pair. With this beam splitter design, the color component beams may cross one another and/or strike the image plane at an angle as opposed to being generally perpendicular to the image plane. This results in relatively weaker intensity beams being received by the photosensor array which causes the photosensor to transmit relatively weaker data signals to an associated data processing unit or the like.

A conventional multilayered dichroic beam splitter such as the beam splitter 20 of FIG. 1 is shown in more detail in FIG. 2. Such a beam splitter 20 is typically comprised of a thin glass plate 22 and a relatively thicker glass plate 24 which have a plurality of dichroic coatings 26, 28, 30 deposited thereon. Disposed between the plates 22, 24 is a spacer 23 which may be comprised of a thin glass plate having no coatings thereon. In particular, the thin plate 22 may be coated on a first side 32 with a dichroic coating 26 which reflects light in a first spectral range and transmits light in all other spectral ranges. The thin plate 22 may be coated on a second side 34 with a dichroic coating 28 which reflects light in a second spectral range and transmits light in all other spectral ranges. The thicker plate 24 may be coated on a first side 36 with a dichroic coating 30 which reflects light in a third spectral range and transmits light in all other spectral ranges. Layers of optical adhesive 38 may then be applied between the thin plate 22 and spacer 23 and also between the thicker plate 24 and spacer 23, and the plates 22, 24 and spacer 23 may be fixedly attached to one another.

Dichroic coatings are well-known in the art of optics and typically consist of 20–30 alternating high and low refractive index optical layers vacuum-deposited on a glass surface to an accumulative thickness of about 1–3 microns. The dichroic coating process must be performed under high temperatures, e.g., on the order of 200°–450° C., and the process usually takes approximately 8–12 hours to complete (including preparatory steps). Consequently, dichroically-coated glass is generally relatively expensive to produce. Thus, it would be desirable to minimize the total number of dichroic coatings used in a beam splitter.

Different types of coatings may be applied depending upon whether the surface to be coated will ultimately have an air immersed interface (i.e., wherein a glass surface interfaces with air such as at surface 32, FIG. 2) or a glass immersed interface (i.e., wherein a glass surfaces interfaces with another glass surface such as at surfaces 34 and 36, FIG. 2). Generally, the coating process for an air immersed interface is relatively less expensive and takes less time to complete than the coating process for a glass immersed interface. Furthermore, an air immersed surface coating process usually involves fewer coating layers, resulting in a thinner dichroic coating and fewer flatness problems than with a glass immersed surface coating. Thus, it would be generally desirable to minimize the number of glass immersed interfaces within a beam splitter.

For the multilayered dichroic beam splitter 20 of FIGS. 1 and 2 which is comprised of three dichroic coatings 26, 28, 30, the coating processes may take as long as 24–36 hours to complete. Also, two out of the three surfaces 32, 34, 36 each have a glass immersed interface and thus would require the less desirable glass immersed interface coating process. Furthermore, since one of the thin glass plates (e.g., the first plate 22) is coated on both sides 32, 34, the plate 22 would be subjected to the dichroic coating process twice, which presents several disadvantages as discussed below.

For instance, due to the number of coating layers (e.g., 20–30) as well as the high temperatures (e.g., 200°–450° C.) required in each coating process, a thin glass plate (e.g., 22) subjected to the coating process twice experiences a significant amount of stress which may cause considerable warpage, as shown in FIG. 3 with the warpage of plate 22 enhanced for illustrative purposes. Such warpage adversely affects the flatness of the thin glass plate 22 as shown and thus may result in color registration error. For example, an incident light beam 70 may deflect a first color component beam 72 from the first dichroic surface 82 of the warped plate 22, a second color component beam 74 from the second dichroic surface 84 of the warped plate 22, and a third color component beam 76 from the dichroic surface 86 of the flat plate 24. Proper color registration is achieved when the first, second, and third color component beams 72, 74, 76 are parallel. Due to the uneven surface of the warped plate 22, one or more of the color component beams 72, 74, 76 may be askew as illustrated in FIG. 3, resulting in color registration error.

Problems may also arise if a defect in the second dichroic coating 28 on the plate 22 is detected after the first dichroic coating 26 has been applied. In such a case, the entire plate 22 usually must be scrapped, and the time spent and expenses incurred in applying both dichroic coatings 26, 28 are wasted. Furthermore, the dichroic coating process for the second dichroic coating 28 may adversely affect the reflective properties of the first dichroic coating 26.

Thus, for the above reasons, it would be desirable to avoid the use of a multilayered beam splitter within a color imaging assembly.

SUMMARY OF THE INVENTION

The present invention may comprise a beam splitter and method for separating a polychromatic light beam into a plurality of spatially and spectrally separated color component beams which are focused at a common image plane. The beam splitter may comprise a plurality of dichroic surfaces which each reflect light in a first spectral range, a second spectral range, or a third spectral range, and transmit light in spectral ranges other than the one it reflects. The beam splitter may also comprise a plurality of reflective surfaces which are each disposed parallel to one of the dichroic surfaces and which each reflect light in at least two of the first, second and third spectral ranges, and preferably in all three spectral ranges. The relative distances between the dichroic surfaces and corresponding reflective surfaces are such that the path lengths of the color component beams are approximately equal.

In particular, the beam splitter may comprise a first surface and a second surface separated by a first distance, a third surface and a fourth surface separated by the first distance, a fifth surface and a sixth surface separated by a second distance which is approximately equal to twice said first distance, and a seventh surface and an eighth surface separated by the second distance. The first, third, fifth, and seventh surfaces may be dichroic surfaces, and the second, fourth, sixth, and eighth surfaces may be reflective surfaces.

BRIEF DESCRIPTION OF THE DRAWINGS

Illustrative and presently preferred embodiments of the invention are shown in the accompanying drawings in which.

DETAILED DESCRIPTION OF THE INVENTION

Figure 4:
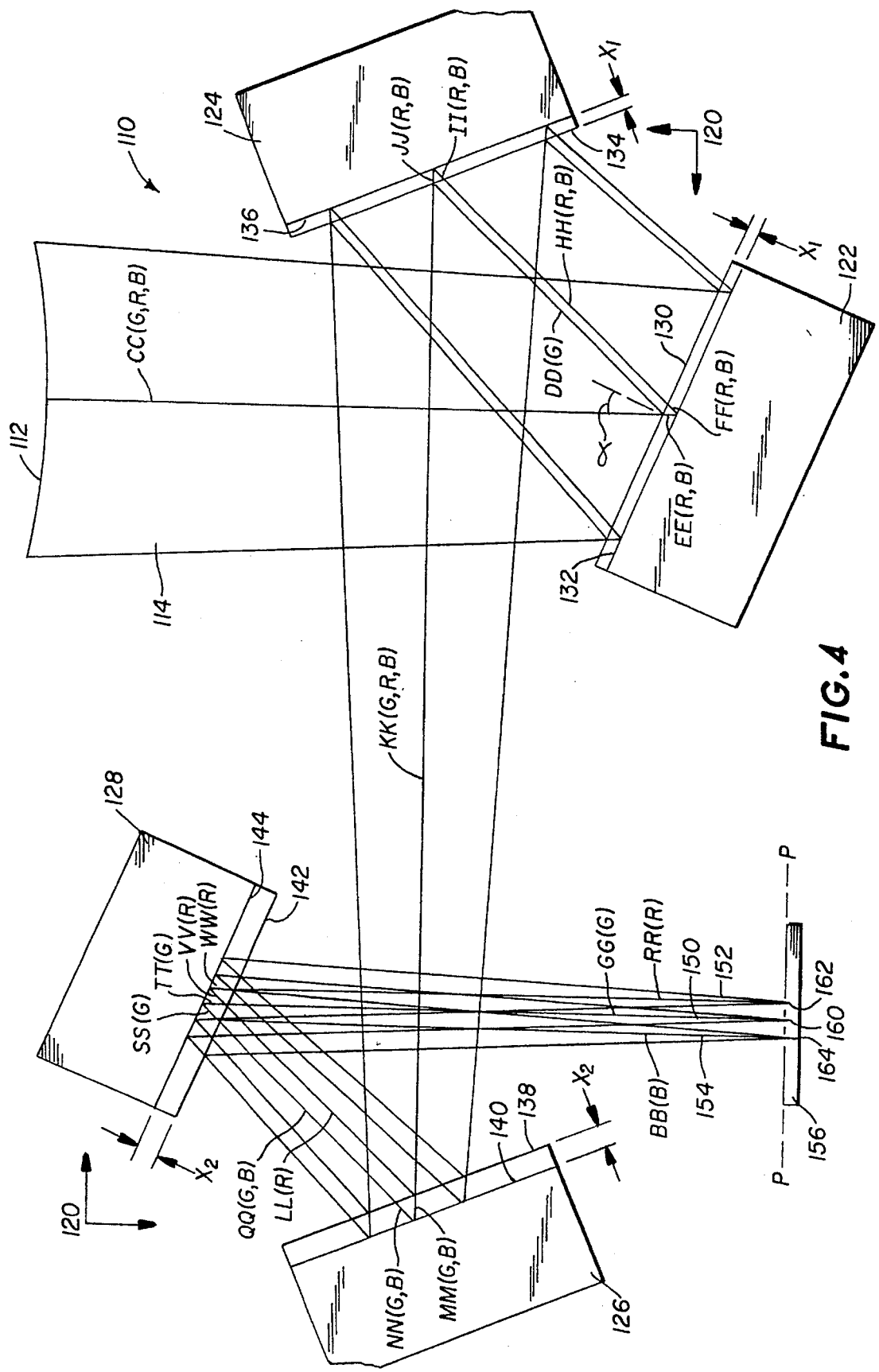
FIG. 4 is a schematic illustration of a color imaging assembly including the beam splitter of the present invention.

FIG. 4 illustrates a color imaging assembly 110 utilizing the beam splitter 120 of the present invention. In general, the color imaging assembly 110 may comprise an imaging lens 112 adapted for focusing a polychromatic imaging light beam 114 having a central longitudinal axis CC. The beam splitter 120 separates the imaging light beam 114 into a plurality of parallel, spatially separated, color component beams 150, 152, 154 (which may be, e.g., green, red and blue component beams) with central longitudinal axes GG, RR, BB, respectively. The beam splitter 120 will be described in further detail below.

Figure 1:
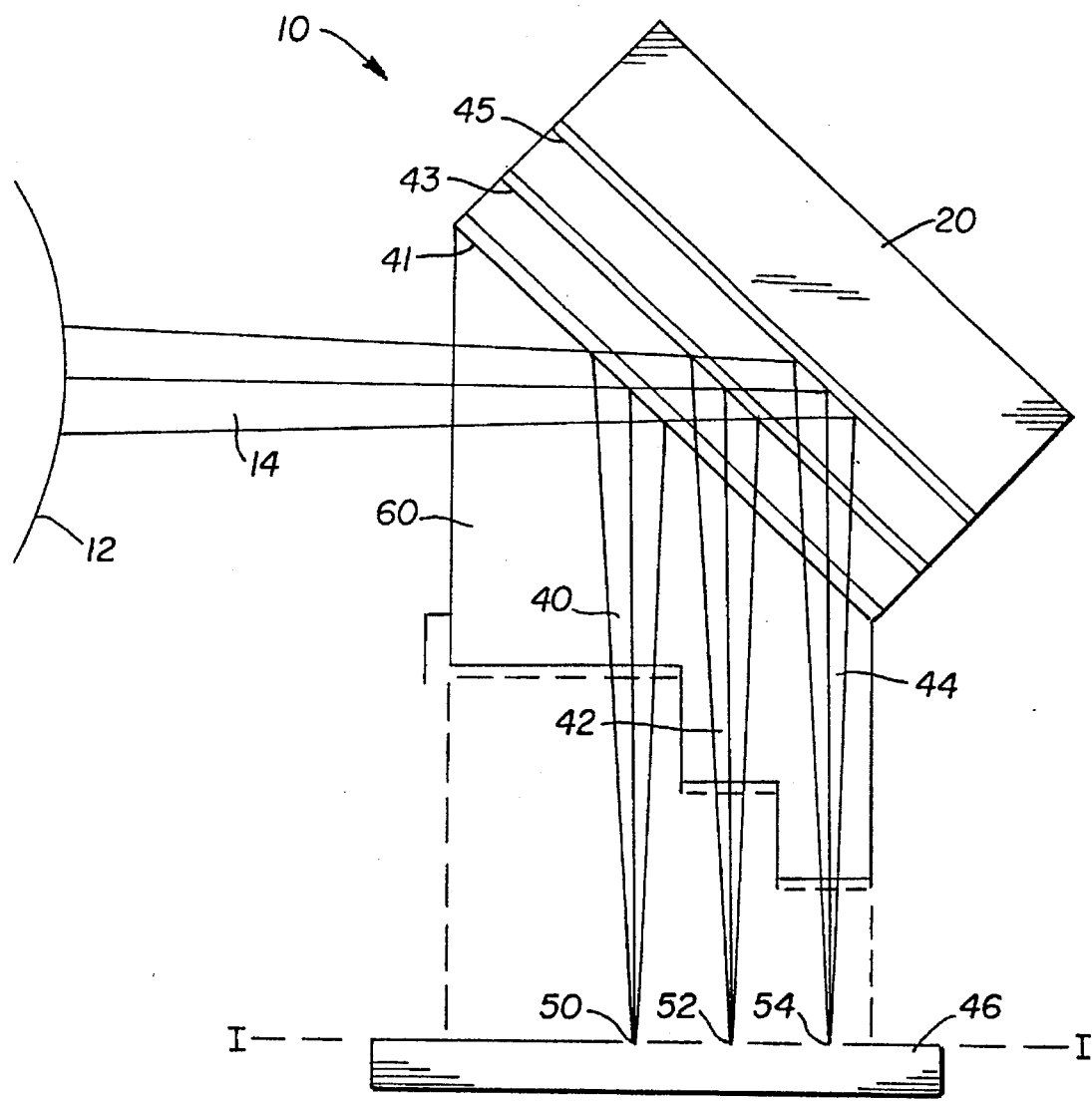
FIG. 1 is a schematic illustration of a prior art color imaging assembly.
Figure 2:
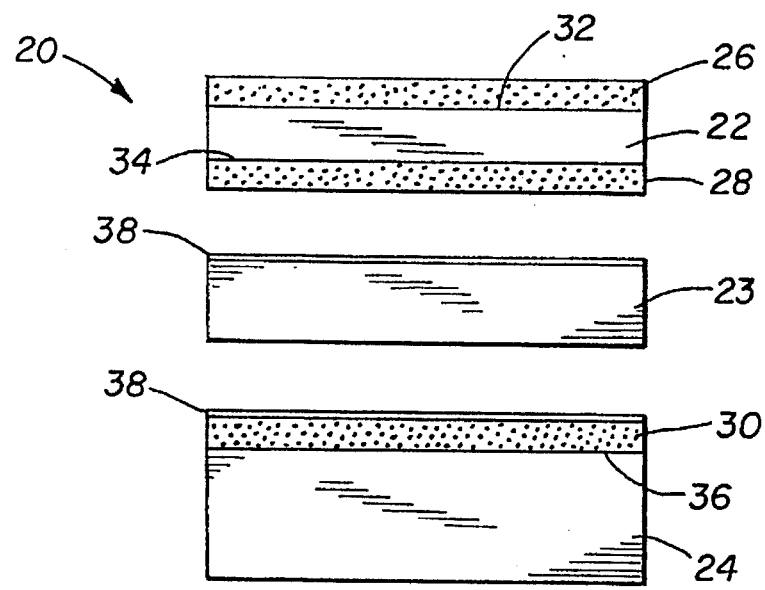
FIG. 2 is an exploded view of a beam splitter of the color imaging assembly shown in FIG. 1.
Figure 3:
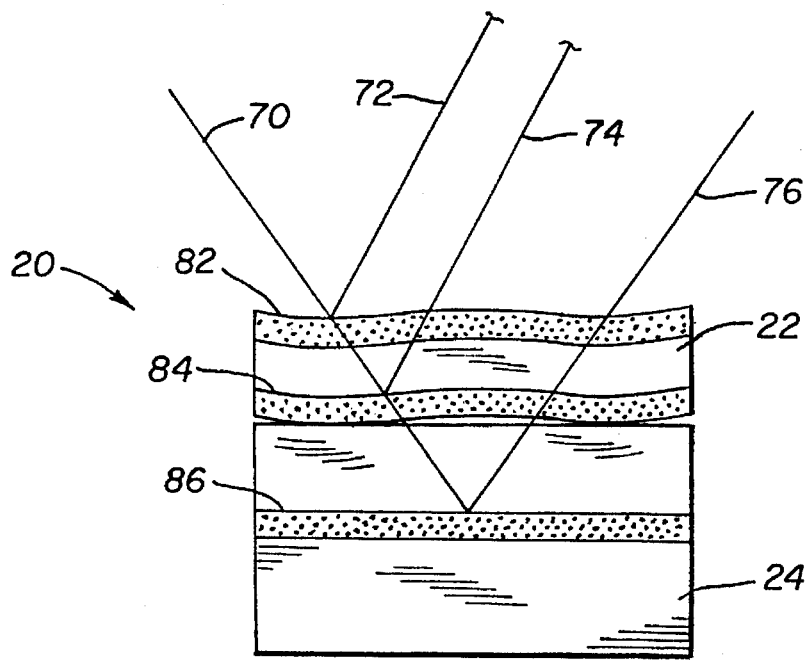
FIG. 3 is a schematic illustration of the beam splitter of FIG. 2 showing the effect of surface warpage upon an incident light beam.

The color component beams 150, 152, 154 may impinge upon a conventional photosensor 156 such as the photosensor 46 described above with reference to FIG. 1. The photosensor 156 may be comprised of a plurality of coplanar linear photosensor arrays 160, 162, 164 which are aligned with the color component beams 150, 152, 154, respectively. The color component beams 150, 152, 154 are focused on the linear photosensor arrays 160, 162, 164 at a common image plane PP, which is preferably perpendicular to the imaging light beam central longitudinal axis CC and the central longitudinal axes GG, RR, BB of the color component beams 150, 152, 154. The linear photosensor arrays 160, 162, 164 may be adapted to transmit data signals representative of the color component images projected thereon by the color component beams 150, 152, 154 to a suitable data processing and data storage unit (not shown).

Referring still to FIG. 4, the beam splitter 120 of the present invention is preferably comprised of a first compound beam-reflecting member 122 (referred to hereinafter simply as a "beam-reflecting member"), a second beam-reflecting member 124, a third beam-reflecting member 126, and a fourth beam-reflecting member 128. Each beam-reflecting member 122, 124, 126, 128 preferably comprises a dichroic coating thereon (discussed in more detail below) which is adapted to reflect light in a first spectral range (e.g., green), a second spectral range (e.g., red) or a third spectral range (e.g., blue) and to transmit light in spectral ranges other than the one that it reflects. Each beam-reflecting member 122, 124, 126, 128 preferably also comprises a reflective coating thereon which is adapted to reflect light in at least two of the first, second and third spectral ranges, and most preferably in all three spectral ranges.

More particularly, the first beam-reflecting member 122 may comprise a first surface 130 having a dichroic coating thereon which is adapted to reflect light in the first spectral range, and to transmit therethrough light in the second spectral range and third spectral range. The first beam-reflecting member 122 may also comprise a second surface 132 having a reflective coating thereon which is adapted to reflect light in at least the second spectral range and the third spectral range, and most preferably in the first, second and third spectral ranges. The second surface 132 is preferably disposed parallel to the first surface 130 and is spaced therefrom at a first distance "$x_1$", FIG. 4 which may be, e.g., approximately 0.158 mm.

The second beam-reflecting member 124 may comprise a third surface 134 having a dichroic coating thereon which is also adapted to reflect light in the first spectral range, and to transmit therethrough light in the second spectral range and third spectral range. The second beam-reflecting member 124 may also comprise a fourth surface 136 having a reflective coating thereon which is adapted to reflect light in at least the second spectral range and the third spectral range, and most preferably in the first, second and third spectral ranges. The fourth surface 136 is preferably disposed parallel to the third surface 134 and is spaced therefrom at the first distance "$x_1$", FIG. 4.

The third beam-reflecting member 126 may comprise a fifth surface 138 having a dichroic coating thereon which is adapted to reflect light in the second spectral range, and to transmit therethrough light in the first spectral range and third spectral range. The third beam-reflecting member 126 may also comprise a sixth surface 140 having a reflective coating thereon which is adapted to reflect light in at least the first spectral range and the third spectral range, and most preferably in the first, second and third spectral ranges. The sixth surface 140 is preferably disposed parallel to the fifth surface 138 and is spaced therefrom at a second distance "$x_2$", FIG. 4, which is equal to approximately twice the first distance "$x_1$", e.g., approximately 0.316 mm. In the preferred embodiment shown in FIG. 4, the fifth and sixth surfaces 138, 140 are also disposed parallel to the third and fourth surfaces 134, 136.

The fourth beam-reflecting member 128 may comprise a seventh surface 142 having a dichroic coating thereon which is adapted to reflect light in the third spectral range, and to transmit therethrough light in the first spectral range and second spectral range. The fourth beam-reflecting member 128 may also comprise an eighth surface 144 having a reflective coating thereon which is adapted to reflect light in at least the first spectral range and the second spectral range, and most preferably in the first, second and third spectral ranges. The eighth surface 144 is preferably disposed parallel to the seventh surface 142 and is spaced therefrom at the second distance "$x_2$", FIG. 4. In the preferred embodiment shown in FIG. 4, the seventh and eighth surfaces 142, 144 are also disposed parallel to the first and second surfaces 130, 132. The relative distances "$x_1$" and "$x_2$" may be adjusted slightly to compensate for any chromatic aberration.

The path of the polychromatic imaging beam 114 from the imaging lens 112 to its division into first, second and third color component beams 150, 152, 154 with central longitudinal axes GG, RR, BB, respectively, which are ultimately separated and focused on the spaced apart linear photosensor arrays 160, 162, 164 at a common image plane PP will now be described with reference to FIG. 4. The effects of refraction are negligible and thus have been ignored for purposes of the following description. For the sake of clarity, the polychromatic imaging beam and the various color component beams and compound beams that are formed are referred to by a letter reference indicative of their respective central longitudinal axes. However, it is to be understood that this description applies to the entire beam associated with each of the reference axes. Also, in the below description for exemplary purposes, the first spectral range is green (and the first color component beam comprises green light), the second spectral range is red (and the second color component beam comprises red light), and the third spectral range is blue (and the third color component beam comprises blue light). It is to be understood that the present invention is not limited to this particular selection and sequence of colors. For clarity, the color components which are included in each light beam discussed below are indicated in parentheses in FIG. 4, i.e., "(G, R, B)" indicates that, for example, green, red and blue light are present in the beam.

In the preferred embodiment of the invention shown in FIG. 4, a polychromatic imaging light beam 114 central longitudinal axis CC passes through the imaging lens 112 and is then directed to the first surface 130. The first surface 130 reflects a first color component beam (G) which travels along path DD to the third surface 134. The first surface 130 transmits therethrough a first compound beam (R, B) (comprising a second color component beam (R) and a third color component beam (B)) along path EE, which is approximately parallel to and in alignment with path CC (ignoring refraction), to the second surface 132. The first compound beam (R, B) is reflected by the second surface 132, and then travels back to the first surface 130 along path FF, which is approximately parallel to but offset from path DD. The first compound beam (R, B) passes through the first surface 132 and travels along path HH, which is approximately parallel to and in alignment with path FF, to the third surface 134.

At the third surface 134, the first color component beam (G) is reflected and the first compound beam (R, B) is transmitted therethrough along path II, which is approximately parallel to and in alignment to path HH, to the fourth surface 136. The fourth surface 136 reflects the first compound beam (R, B) along path JJ back to the third surface 134. As shown in FIG. 4, the first compound beam (R, B) is realigned with the first color component beam (G) at the third surface 134, and the beams (R, B, G) travel along path KK, which is approximately parallel to and in alignment with path JJ, to the fifth surface 138. The fifth surface 138 reflects a second color component beam (R) of the first compound beam (R, B) which travels along path LL to the seventh surface 142. The fifth surface 138 transmits therethrough a second compound beam (G, B) (comprising the first color component beam (G) and the third color component beam (B) along path MM, which is approximately parallel to and in alignment with path KK, to the sixth surface 140. The second compound beam (G, B) is reflected by the sixth surface 140, and then travels back to the fifth surface 138 along path NN, which is approximately parallel to but offset from path LL. The second compound beam (G, B) passes through the fifth surface 138 and travels along path QQ, which is approximately parallel to and in alignment with path NN, to the seventh surface 142.

At the seventh surface 142, the third color component beam (B) (from the second compound beam (G, B)) is reflected and travels along path BB to the photosensor array 164 at the image plane PP. The first color component beam (G) (of the second compound beam (G, B)) is transmitted through the seventh surface 142 along path SS, which is approximately parallel to and in alignment with path QQ, to the eighth surface 144. The first color component beam (G) is reflected by the eighth surface 144 and travels back along path TT to the seventh surface 142. The first color component beam (G) passes through the seventh surface 142 and travels along path GG to the photosensor array 160 at the image plane PP.

The second color component beam (R) (travelling along path LL) is transmitted through the seventh surface 142 along path VV to the eighth surface 144. The second color component beam (R) is reflected by the eighth surface 144 and travels along path WW back to the seventh surface 142. The second color component beam (R) passes through the seventh surface 142 and travels along path RR to the photosensor array 162 at the image plane PP.

The angle of incidence "α", FIG. 4, of the polychromatic imaging beam 114 upon the first surface 130 is preferably approximately 22.5°. The angles of incidence of each beam described above upon each of the surfaces 130, 132, 134, 136, 138, 140, 142, 144 are preferably approximately equal to "α", but may vary slightly due to refraction.

In the configuration described above and shown in FIG. 4, the total optical path lengths of the color component beams 150, 152, 154 (including the paths in which the color component beams are part of a compound or polychromatic beam) from the imaging lens 112 to the image plane PP are approximately equal. Thus, the present invention eliminates the need for a separate path length compensator.

Specifically, the total optical path length of each color component beam 150, 152, 154 (G, R, B) includes the lengths of (1) the imaging beam central longitudinal axis CC from the imaging lens 112 to the first surface 130; (2) path KK from the third surface 134 to the fifth surface 138; and (3) the paths GG, BB, or RR from the seventh surface 142 to the image plane PP, which are of approximately equal length.

The total optical path length of the first color component beam 150 (G) includes numbers (1) to (3) above and further includes the lengths of: (4) path DD from the first surface 130 to the third surface 134; (5) path MM from the fifth surface 138 to the sixth surface 140; (6) path NN from the sixth surface 140 back to the fifth surface 138; (7) path QQ from the fifth surface 138 to the seventh surface 142; (8) path SS from the seventh surface 142 to the eighth surface 144; and (9) path TT from the eighth surface 144 back to the seventh surface 142.

The total optical path length of the second color component beam 152 (R) includes numbers (1) to (3) above and further includes the lengths of (10) path EE from the first surface 130 to the second surface 132; (11) path FF from the second surface 132 back to the first surface 130; (12) path HH from the first surface 130 to the third surface 134; (13) path II from the third surface 134 to the fourth surface 136; (14) path JJ from the fourth surface 136 back to the third surface 134; (15) path LL from the fifth surface 138 to the seventh surface 142; (16) path VV from the seventh surface 142 to the eighth surface 144; and (17) path WW from the eighth surface 144 back to the seventh surface 142.

The total optical path length of the third color component beam 154 (B) includes numbers (1) to (3), (5) to (7), and (10) to (14) above.

As previously stated, paths CC and KK above are common to each color component beam 150, 152, 154 (G, R, B), and paths GG (R), RR (R) and BB (B) are approximately equal in length. Furthermore, paths DD (G) and HH (R, B) are approximately equal in length, as are paths QQ (G, B) and LL (R). Paths EE, FF, II and JJ (each R, B) are each approximately equal to $x_1/\cos(\alpha)$. Paths MM, NN (each G, B); SS, TT (each G); VV and WW (each R) are each approximately equal to $x_2/\cos(\alpha) = 2x_1/\cos(\alpha)$. Thus, in addition to the common and equal length paths noted above, the first, second and third color component beams 150, 152, 154 (G, R, B) each travels a distance approximately equal to $8x_1/\cos(\alpha)$ (ignoring refraction, which is negligible and effects each component beam 150, 152, 154 (G, R, B) equally).

Figure 5:
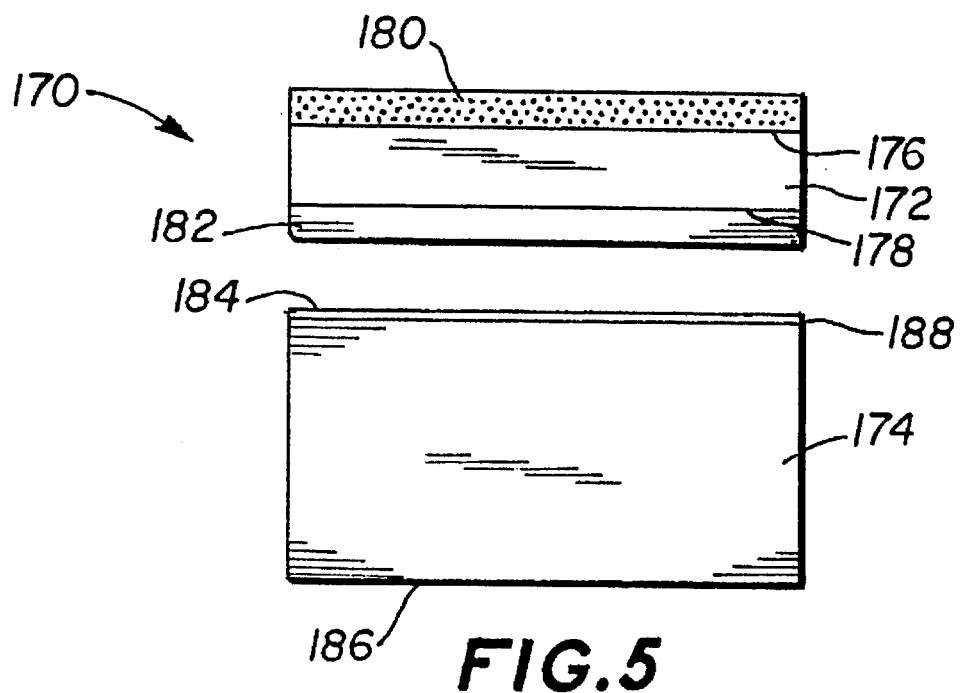
FIG. 5 is an exploded view of a beam-reflecting member of the beam splitter shown in FIG. 4.
Figure 6:
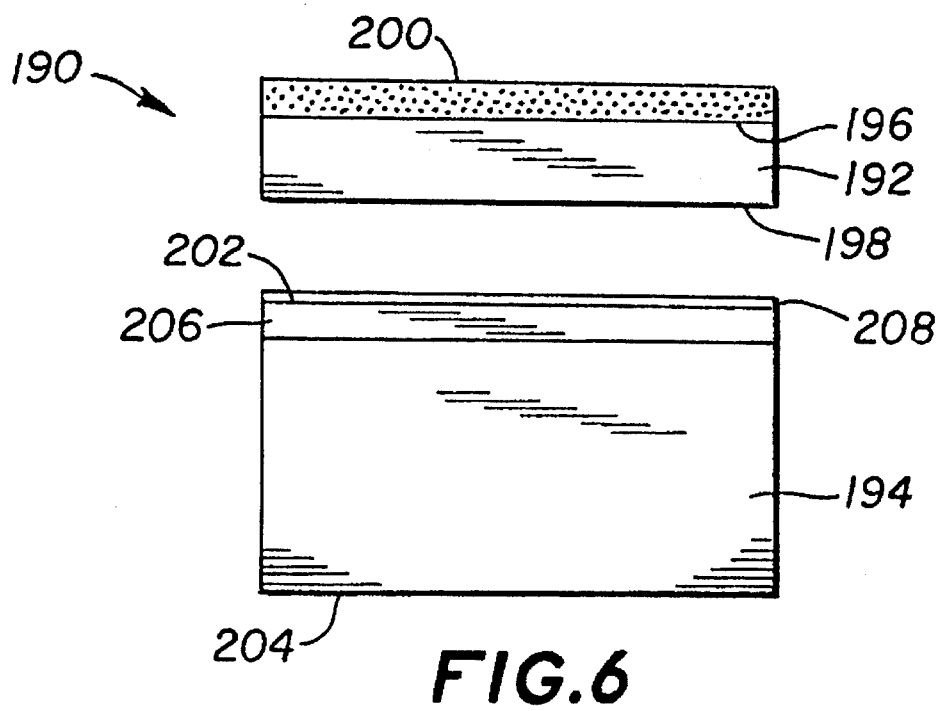
FIG. 6 is an exploded view of another embodiment of a beam-reflecting member of the beam splitter shown in FIG. 4.
Figure 7:
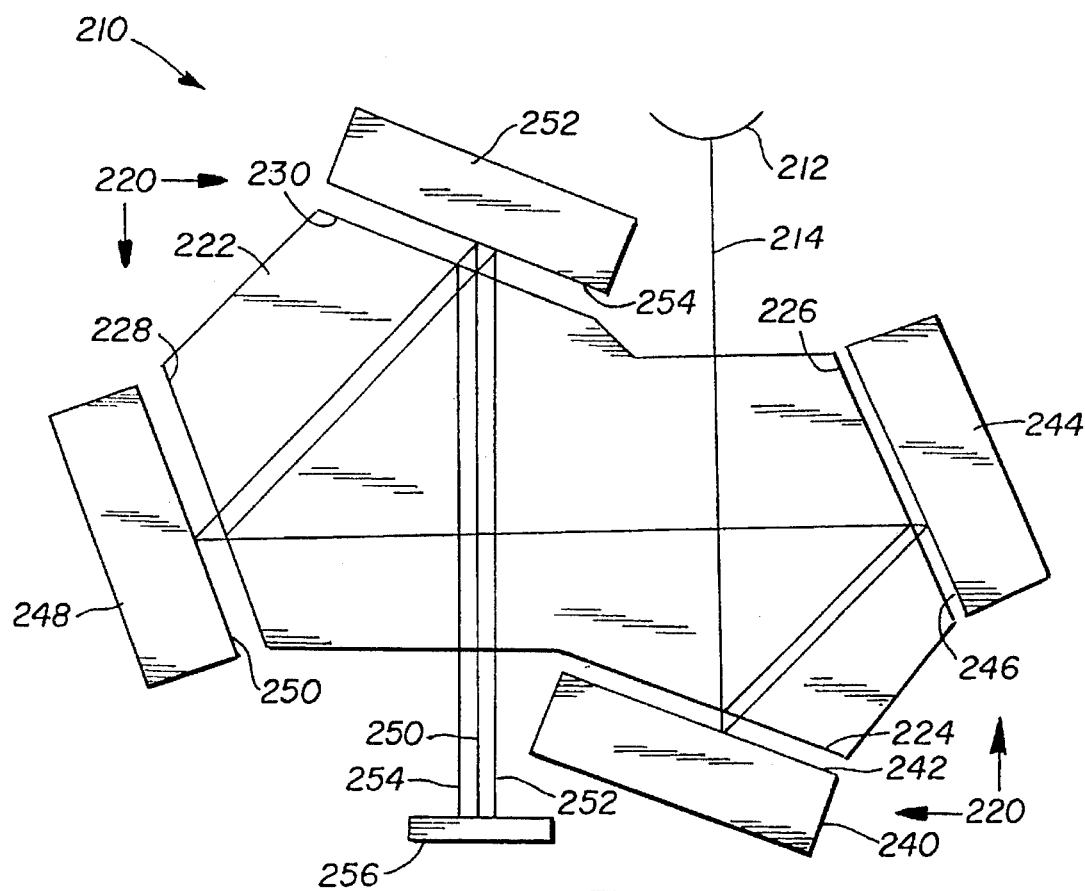
FIG. 7 is a schematic illustration of another embodiment of the beam splitter of the present invention within a color imaging assembly.

Referring now to FIGS. 5–7, each of the first, second, third and fourth beam-reflecting members 122, 124, 126, 128, respectively, are preferably identically constructed. FIG. 5 illustrates one such construction, and it is to be understood that the description below of the beam-reflecting member 170 may apply to each of the beam-reflecting members 122, 124, 126, 128.

The beam-reflecting member 170 of FIG. 5 is comprised of a first integral portion 172 which preferably consists of a thin glass plate, and a second integral portion 174 which preferably consists of a relatively thicker glass plate. The first integral portion 172 may be, e.g., approximately 0.100–0.300 mm thick, and the second integral portion 174 may be, e.g., approximately 1.0–3.0 mm thick.

The first integral portion 172 comprises a first surface 176 and a second surface 178. The first surface 176 preferably comprises a dichroic coating 180 which reflects light in the first, second or third spectral range (e.g., green, red or blue light). The second surface 178 preferably comprises a reflective coating 182 which reflects light in at least two of the first, second, and third spectral ranges. Such a reflective coating 182 may be, e.g., a mirror coating which reflects light in all three spectral ranges.

Depositing a mirror coating is typically considerably less time-consuming and expensive as compared to depositing a dichroic coating. First, a dichroic coating process is usually a batch process while a mirror coating process is generally continuous. Thus, large sheets of glass with mirror coatings thereon may be mass-produced and later cut into desired portions. Also, a mirror coating usually involves relatively less coating layers (e.g., 4) with relatively fewer materials (e.g., 3) as compared to a typical dichroic coating which involves 20–30 coating layers with 6–12 different materials. Furthermore, in comparison to the approximately 8–12 hours for completing a dichroic coating, a mirror coating may be completed in approximately 10–20 minutes. In addition, a mirror coating process is typically performed under relatively lower temperatures (e.g., approximately 200°–220° C.) than a dichroic coating process (e.g., up to about 450° C.). Furthermore, because of the lower temperatures and fewer coating layers involved with a mirror coating process, there is usually considerably less warpage of the glass upon which a mirror coating is applied as compared to the warpage involved with a dichroic coating.

The second integral portion 174 also comprises a first surface 184 and a second surface 186. An adhesive layer 188 may be applied to the first surface 186 of the second integral portion 174 (or it may alternatively be applied to the mirror coating 182 on the first integral portion 172), and the first integral portion 172 may be fixedly attached thereto.

The initial step in constructing the beam-reflecting member 170 is preferably depositing a reflective coating 182 on the first integral portion second surface 178. Next, the adhesive layer 188 may be applied to the second integral portion first surface 184 (or it may alternatively be applied to the reflective coating 182 on the first integral portion 172). The first integral portion 172 is then fixedly attached to the second integral portion 174. Finally, the dichroic coating 180 may be applied to the first surface 176 of the first integral portion 172. An advantage to fixedly attaching the integral portions 172, 174 prior to applying the dichroic coating 180 is that a thicker, stronger base is provided by the combination of integral portions 172, 174, thus reducing or eliminating the glass warpage typically resulting from applying a dichroic coating. However, it is to be understood that the dichroic coating 180 may alteratively be applied prior to fixedly attaching the integral portions 172, 174.

FIG. 6 illustrates the presently preferred embodiment of a beam-reflecting member 190. The beam-reflecting member 190 of FIG. 6 may be substantially identical to the beam-reflecting member 170 of FIG. 5, except where otherwise noted below. It is to be understood that the description below of the beam-reflecting member 190 may apply to each of the beam-reflecting members 122, 124, 126, 128.

The beam-reflecting member 190 of FIG. 6 is comprised of a first integral portion 192 which preferably consists of a thin glass plate, and a second integral portion 194 which preferably consists of a relatively thicker glass plate. The first integral portion 192 comprises a first surface 196 and a second surface 198. The first surface 196 preferably comprises a dichroic coating 200 which reflects light in the first, second or third spectral range (e.g., green, red or blue light).

The second integral portion 194 also comprises a first surface 202 and a second surface 204. The first surface 202 preferably comprises a reflective coating 206 which reflects light in at least two of the first, second, and third spectral ranges. Such a reflective coating 206 may be, e.g., a mirror coating which reflects light in all three spectral ranges.

An adhesive layer 208 may be applied to the reflective coating 206 on the second integral portion first surface 202 (or it may alternatively be applied to the second surface 198 of the first integral portion 192), and the first integral portion 192 may be fixedly attached thereto.

In constructing the beam-reflecting member 190, the preferred initial step is to deposit a reflective coating 206 such as a mirror coating on the second integral portion 194 first surface 202. The first integral portion 192 is then fixedly attached to the second integral portion 194 with the layer of adhesive 208 therebetween. Finally, a dichroic coating 200 may be deposited on the first integral portion 192 first surface 196.

Alternatively, the dichroic coating 200 may be deposited on the first integral portion 192 first surface 196, and a mirror coating 206 may be separately deposited on the second integral portion first surface 202. The first integral portion 192 may then be fixedly attached to the second integral portion 194 with the layer of adhesive 208 therebetween.

FIG. 7 illustrates yet another embodiment of the beam splitter 220 of the present invention within a color imaging assembly 210. The color imaging assembly 210 may identical to the color imaging assembly 110, FIG. 4, except where otherwise noted below. The color imaging assembly 210 preferably includes an imaging lens 212 through which a polychromatic imaging light beam 214 passes; a beam splitter 220 which separates the imaging light beam 214 into a plurality of color component beams 250, 252, 254; and a photosensor 256 which receives the color component beams 250, 252, 254.

The beam splitter 220 may include a prism 222 having a plurality of dichroically-coated surfaces 224, 226, 228, 230. Dichroic surface 224 corresponds generally to the first surface 130 of the beam splitter shown in FIG. 4; dichroic surface 226 corresponds generally to the third surface 134 thereof; dichroic surface 228 corresponds generally to the fifth surface 138 thereof; and dichroic surface 140 corresponds generally to the seventh surface 142 thereof. The beam splitter 220 may also include a first integral member 240 comprising a reflective surface 242 which corresponds generally to the second surface 132, FIG. 4; a second integral member 244 comprising a reflective surface 246 which corresponds generally to the fourth surface 136, FIG. 4; a third integral member 248 comprising a reflective surface 250 which corresponds generally to the sixth surface 140, FIG. 4; and a fourth integral member 252 comprising a reflective surface 254 which corresponds generally to the eighth surface 144, FIG. 4.

The relative distances between the dichroic surfaces 224, 226, 228, 230 and adjacent reflective surfaces 242, 246, 250, 254, respectively, as well as their orientation, is preferably identical to that described with reference to FIG. 4. The relative spacing between the surfaces may be provided by placing spacers (not shown) between the each dichroic surface 224, 226, 228, 230 and its adjacent reflective surface 242, 246, 250, 254, respectively. The spacers may be, for example, thin plates of glass. As with the embodiment of FIG. 4, the beam splitter 220 of FIG. 7 provides approximately equal optical path lengths for the color component beams 250, 252, 254 (e.g., green, red and blue component beams) using dichroic surfaces 224, 226, 228, 230 which are parallel to reflective surfaces 242, 246, 250, 254, respectively.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. A beam splitter for separating a polychromatic light beam into a plurality of spatially and spectrally separated color component beams which are focused at a common image plane, comprising:

a) a first surface and a second surface having different light reflective properties and separated by a first distance;

b) a third surface and a fourth surface having different light reflective properties and separated by said first distance;

c) a fifth surface and a sixth surface having different light reflective properties and separated by a second distance which is substantially equal to twice said first distance; and d) a seventh surface and an eighth surface having different light reflective properties and separated by said second distance.

2. The invention of claim 1, wherein:

a) said first surface reflects light in a first spectral range and transmits therethrough light in a second spectral range and a third spectral range;

b) said second surface is disposed parallel to said first surface and reflects light in said second spectral range and said third spectral range;

c) said third surface is disposed obliquely to said first surface and said second surface and reflects light in said first spectral range and transmits therethrough light in said second spectral range and said third spectral range;

d) said fourth surface is disposed parallel to said third surface and reflects light in said second spectral range and said third spectral range;

e) said fifth surface is disposed obliquely to said first surface and said second surface and reflects light in said second spectral range and transmits therethrough light in said first spectral range and said third spectral range;

f) said sixth surface is disposed parallel to said fifth surface and reflects light in said first spectral range and said third spectral range;

g) said seventh surface is disposed obliquely to said fifth surface and said sixth surface and reflects light in said third spectral range and transmits therethrough light in said first spectral range and said second spectral range; and h) said eighth surface is disposed parallel to said seventh surface and reflects light in said first spectral range and said second spectral range.

3. The invention of claim 2 wherein said first surface and said second surface are disposed parallel to said seventh surface and said eighth surface.

4. The invention of claim 2 wherein said third surface and said fourth surface are disposed parallel to said fifth surface and said sixth surface.

5. The invention of claim 1 wherein said color component beams comprise optical path lengths defined by the paths of travel of said color component beams between an imaging lens and said image plane, said optical path lengths being substantially equal to one another.

6. The invention of claim 2 wherein:

a) said first surface and said third surface comprise a first dichroic coating which reflects light in said first spectral range;

b) said fifth surface comprises a second dichroic coating which reflects light in said second spectral range;

c) said seventh surface comprises a third dichroic coating which reflects light in said third spectral range; and d) each of said second surface, fourth surface, sixth surface, and eighth surface comprises a reflective coating which reflects light in at least two of said first spectral range, second spectral range, and third spectral range.

7. The invention of claim 1 further comprising:

a) a first beam-reflecting member comprising a first beam-reflecting member first integral portion and a first beam-reflecting member second integral portion fixedly attached thereto, said first beam-reflecting member comprising said first surface and said second surface;

b) a second beam-reflecting member comprising a second beam-reflecting member first integral portion and a second beam-reflecting member second integral portion fixedly attached thereto, said second beam-reflecting member comprising said third surface and said fourth surface;

c) a third beam-reflecting member comprising a third beam-reflecting member first integral portion and a third beam-reflecting member second integral portion fixedly attached thereto, said third beam-reflecting member comprising said fifth surface and said sixth surface; and d) a fourth beam-reflecting member comprising a fourth beam-reflecting member first integral portion and a fourth beam-reflecting member second integral portion fixedly attached thereto, said fourth beam-reflecting member comprising said seventh surface and said eighth surface.

8. The invention of claim 7, wherein:

a) said first beam-reflecting member first integral portion comprises said first surface and said second surface;

b) said second beam-reflecting member first integral portion comprises said third surface and said fourth surface;

c) said third beam-reflecting member first integral portion comprises said fifth surface and said sixth surface; and d) said fourth beam-reflecting member first integral portion comprises said seventh surface and said eighth surface.

9. The invention of claim 7, wherein:

a) said first beam-reflecting member first integral portion comprises said first surface;

b) said first beam-reflecting member second integral portion comprises said second surface;

c) said second beam-reflecting member first integral portion comprises said third surface;

d) said second beam-reflecting member second integral portion comprises said fourth surface;

e) said third beam-reflecting member first integral portion comprises said fifth surface;

f) said third beam-reflecting member second integral portion comprises said sixth surface;

g) said fourth beam-reflecting member first integral portion comprises said seventh surface; and h) said fourth beam-reflecting member second integral portion comprises said eighth surface.

10. The invention of claim 1 further comprising:

a) a prism which comprises said first surface, third surface, fifth surface, and seventh surface; and b) a plurality of integral members each comprising one of said second surface, fourth surface, sixth surface, and eighth surface.

11. A method for separating a polychromatic imaging light beam into three parallel color component beams having approximately equal optical path lengths between an imaging lens and a common image plane, comprising:

a) reflecting said polychromatic beam off of first and second surfaces each having different light reflective properties and separated by a first distance;

b) reflecting the light from said first and second surfaces off of third and fourth surfaces, each of said third and fourth surfaces having different light reflective properties and separated by said first distance;

c) reflecting the light from said third and fourth surfaces off of fifth and sixth surfaces, each of said fifth and sixth surfaces having different light reflective properties and separated by a second distance which is substantially equal to twice said first distance; and d) reflecting the light from said fifth and sixth surfaces off of seventh and eighth surfaces, each of said seventh and eighth surfaces having different light reflective properties and separated by said second distance.

12. The method of claim 11 wherein step (a) comprises separating the polychromatic beam into a first color component beam and a first compound beam parallel to and offset from the first color component beam.

13. The method of claim 12 wherein step (b) comprises shifting said first color component beam and said first compound beam into coaxial alignment.

14. The method of claim 13 wherein step (c) comprises producing a second color component beam and a second compound beam in parallel, offset relationship.

15. The method of claim 14 wherein step (d) comprises separating the second color component beam and second compound beam into three spatially separate, parallel color component beams.

16. A method of separating a polychromatic light beam into a first color component beam comprising light in a first spectral range, a second color component beam comprising light in a second spectral range, and a third color component beam comprising light in a third spectral range, which are focused on a common image plane, comprising:

a) directing said polychromatic light beam to a first surface which reflects said first color component beam and transmits therethrough a first compound beam comprising said second color component beam and said third color component beam;

b) directing said first color component beam to a third surface which reflects said first color component beam;

c) directing said first compound beam to a second surface which reflects said first compound beam, said second surface being spaced from said first surface at a first distance;

d) directing said first compound beam to said third surface which transmits therethrough said first compound beam;

e) directing said first compound beam to a fourth surface which reflects said first compound beam, said fourth surface being spaced from said third surface at said first distance;

f) directing said first color component beam and said first compound beam in coaxial alignment to a fifth surface which reflects said second color component beam and transmits therethrough a second compound beam comprising said first color component beam and said third color component beam;

g) directing said second compound beam to a sixth surface which reflects said second compound beam, said sixth surface being spaced from said fifth surface at a second distance which is approximately twice said first distance;

h) directing said second compound beam to a seventh surface which reflects said third color component beam and transmits therethrough said first color component beam;

i) directing said second color component beam to said seventh surface which transmits therethrough said second color component beam;

j) directing said first color component beam and said second color component beam to an eighth surface which reflects said first color component beam and said second color component beam, said eighth surface being spaced from said seventh surface by said second distance;

k) directing said first color component beam, second color component beam, and third color component beam in spatially separated, parallel relationship to said image plane.

* * * * *

UNITED STATES PATENT AND TRADEMARK OFFICE
CERTIFICATE OF CORRECTION

PATENT NO. : 5,541,771
DATED : 07/30/96
INVENTOR(S) : David D. Bohn

It is certified that error appears in the above-identified patent and that said Letters Patent is hereby corrected as shown below:

Column 11, line 57, "6. The invention of claim 2 wherein:" should read
-- 6. The invention of claim 1 wherein:--;

Signed and Sealed this

Ninth Day of June, 1998

Attest:

BRUCE LEHMAN

Attesting Officer     Commissioner of Patents and Trademarks